United States Patent [19]

Bowman

[11] 4,251,351
[45] Feb. 17, 1981

[54] PROCESSING OF CALCIUM CARBONATE MINERALS

[75] Inventor: Henry T. A. Bowman, St. Austell, England

[73] Assignee: English Clays Lovering Pochin & Co., Ltd., Cornwall, England

[21] Appl. No.: 927,360

[22] Filed: Jul. 24, 1978

[30] Foreign Application Priority Data

Jul. 27, 1977 [GB] United Kingdom ............... 31422/77

[51] Int. Cl.³ ................................................ B03B 1/04
[52] U.S. Cl. ....................................... 209/5; 209/211; 241/16; 423/430
[58] Field of Search ...................... 209/5, 211; 423/430; 241/16, 20, 24

[56] References Cited

U.S. PATENT DOCUMENTS

| | | | |
|---|---|---|---|
| 2,274,521 | 2/1942 | Berly | 209/5 |
| 2,987,473 | 6/1961 | Millman | 209/5 X |
| 3,229,917 | 1/1966 | Miller | 209/5 X |
| 3,572,500 | 3/1971 | Kuvlohens | 209/5 |
| 4,018,673 | 4/1977 | Hughes | 209/211 X |

FOREIGN PATENT DOCUMENTS

| | | | |
|---|---|---|---|
| 473090 | 4/1951 | Canada | 241/24 |
| 1204511 | 9/1970 | United Kingdom | 423/430 |
| 1215576 | 12/1970 | United Kingdom | 209/5 |

*Primary Examiner*—Robert Halper
*Attorney, Agent, or Firm*—Weingram & Klauber

[57] ABSTRACT

A stable, pumpable suspension of a calcium carbonate mineral is prepared by a method which includes the step of removing abrasive particles from a deflocculated, concentrated aqueous suspension of the calcium carbonate mineral by centrifuging the suspension at a solids content of at least 65% by weight under conditions such that the quantity of particles in said suspension having an equivalent spherical diameter larger than 10 μm is reduced.

8 Claims, No Drawings

PROCESSING OF CALCIUM CARBONATE MINERALS

BACKGROUND OF THE INVENTION

This invention relates to calcium carbonate minerals and, more particularly, is concerned with finely comminuted calcium carbonate minerals which can be used, for example, as pigments in paper coating or emulsion paints or as fillers in rubber and plastics materials. The term "calcium carbonate mineral" as used herein includes natural chalk, vein calcite, calcite marble, limestone and dolomite.

It is known to grind calcium carbonate minerals to a fine particle size, for example to a size such that at least 60% by weight of the calcium carbonate mineral consists of particles having an equivalent spherical diameter smaller than 2 $\mu$m, by forming a concentrated aqueous suspension of the calcium carbonate mineral in the presence of a deflocculating agent, and subjecting the deflocculated aqueous suspension to attrition grinding with a particulate grinding medium, such as a silica sand.

A convenient form in which a finely ground calcium carbonate mineral can be transported and sold is as a deflocculated aqueous suspension having a solids content such that little, if any, sedimentation of the particles occurs during transit and storage. In order to meet this requirement the solids content of the suspension should be high, i.e. about 65% or more by weight, and preferably in the range of from 70% to 85% by weight. Also, it is generally found that the suspension should not contain more than about 1% by weight of particles larger than 50 $\mu$m and that at least 5 horsepower hours of energy per ton of dry calcium carbonate mineral should be dissipated in the suspension to ensure that a uniform and stable suspension is formed. It would be advantageous to be able to perform all the necessary operations on the calcium mineral in an aqueous suspension having a solids content close to that required for the slurry which is to be transported and sold, because if any operation has to be performed on a more dilute suspension it is necessary to add water to the raw calcium carbonate mineral (which may contain in the natural state up to about 20% by weight of water), and then dewater the suspension by some means. Such dewatering operations are difficult and expensive.

A problem which arises in the production of aqueous suspensions of finely ground calcium carbonate minerals at high solids contents is that even after grinding with a particulate grinding medium and passing the suspension of ground calcium carbonate mineral through a sieve to remove substantially all particles larger than 50 $\mu$m, the calcium carbonate still contains a small proportion, say up to about 5% by weight, of particles smaller than 50 $\mu$m but larger than 10 $\mu$m. Among the particles in this size range there are inevitably particles of hard impurities, such as silica, which cause abrasion problems when the ground calcium carbonate is used as a pigment or filler.

SUMMARY OF THE INVENTION

According to the present invention, there is provided, in a method of preparing a stable, pumpable suspension of a calcium carbonate mineral, the step of removing abrasive particles from a deflocculated, concentrated aqueous suspension of the calcium carbonate mineral by centrifuging the suspension at a solids content of at least 65% by weight under conditions such that the quantity of particles having an equivalent spherical diameter larger than 10 $\mu$m present in said suspension is reduced.

In a preferred embodiment of the present invention there is provided a method of preparing an aqueous suspension of a calcium carbonate mineral which is substantially free of abrasive particles which method comprises comminuting said calcium carbonate mineral under conditions such that there is obtained a deflocculated aqueous suspension of the calcium carbonate mineral which has a solids content of at least 65% by weight and which is substantially free of particles larger than 50 $\mu$m; and centrifuging said deflocculated aqueous suspension of calcium carbonate mineral under conditions such that there is obtained calcium carbonate product, of which the content of particles having an equivalent spherical diameter larger than 10 $\mu$m is less than 1% by weight and which is in the form of a stable, pumpable suspension, and a residue which contains particles larger than 10 $\mu$m in a substantially dry form.

The calcium carbonate mineral is preferably comminuted under conditions such that there is obtained a deflocculated aqueous suspension having a solids content in the range of from 70% to 85% by weight. The calcium carbonate mineral is preferably comminuted so as to give a mineral of which at least 60% by weight, and preferably at least 80% by weight, consists of particles smaller than 2 $\mu$m equivalent spherical diameter. The suspension is preferably deflocculated with from 0.05% to 0.50% by weight, based on the weight of dry calcium carbonate, of a dispersing agent (or deflocculant) which is an organic polymer, such as a water-soluble salt of a poly(acrylic acid) or of a poly(methacrylic acid) having a number of average molecular weight not greater than 5,000 or a copolymer of the type described in British Pat. No. 1,414,964. The method of comminuting the calcium carbonate mineral will depend, to some extent, on the nature of the calcium carbonate mineral: if the mineral is a natural chalk (i.e. a mineral formed from coccoliths in the cretaceous period of geology) the method employed is advantageously in accordance with that described and claimed in British Pat. No. 1,215,576; and if the calcium carbonate mineral is a limestone or a marble the method employed is advantageously in accordance with that described in U.S. Pat. application Ser. No. 880,875 in the name of Herbert Heminsley.

In one embodiment of the invention, a natural chalk is comminuted by first crushing the raw chalk from the quarry by a sawtooth crusher, such as is described at page 8–22 in the "Chemical Engineers' Handbook" by Robert H. Perry and Cecil H. Chilton, published by McGraw-Hill Book Company, New York, 1973. The crushed chalk is then fed to a continuous, conical ball mill discharging from a trommel screen (as manufactured by Hardinge-Koppers Company and described at pages 8–28 and 8–29 of the "Chemical Engineers' Handbook") together with sufficient water to form an aqueous suspension having a solids content in the range of from 60 to 75% by weight, preferably from 68 to 72% by weight, and with from 0.05 to 0.5% by weight, based on the weight of dry crude chalk, of a dispersing agent. No grinding balls are used in the mill, the grinding proceeding autogenously with the flints which are present in the crude chalk acting as grinding bodies for the chalk. A deflocculated aqueous suspension of chalk flows through the apertures of the trommel and is then screened through a sieve of aperture 0.25 mm. The suspension passing through the sieve is then subjected to a sand grinding process in apparatus as described in British Pat. No. 1,469,028 until the particle size distribution of the comminuted material is such that at least 60% by weight consists of particles having an equivalent spherical diameter smaller than 2 microns, not more than 5% by weight consists of particles having an equivalent spherical diameter larger than 10 microns and not more then 0.05% by weight consists of particles which are retained on a sieve of aperture size 53 microns. The suspension of finely ground chalk is discharged from the sand grinder through a sieve of aperture size 0.25 mm. and is then either fed directly to a centrifuge, in accordance with the invention, or first passed through a sieve of aperture 45 microns and then fed to a centrifuge.

The centrifuge used in the method of the invention should be capable of producing an acceleration of at least 300 g. Furthermore it is advantageous if the deflocculated aqueous suspension of the calcium carbonate mineral is centrifuged for a time such that the product of residence time in seconds and centrifuge acceleration as a multiple of the acceleration due to gravity is at least 12,000 g-seconds.

The product should preferably contain not more than 0.5% by weight of particles having an equivalent spherical diameter greater than 10 $\mu$m and have an abrasion (as measured by the Valley abrasion test) which is preferably not greater than 30. The Valley abrasion test used herein was carried out in the same manner as and using the same apparatus as that described in U.S. Pat. application Ser. No. 879,221 in the name of K. M. Beazley and W. R. Williams.

The residue, containing the abrasive particles, should preferably have a solids content of at least 85% by weight so that the material is substantially dry and non-sticky and therefore does not stick together on discharge from the centrifuge with resultant handling problems.

The centrifuge may be of the batch or continuous discharge type. A batch centrifuge may be supplied continuously with a feed suspension for a given period and during this period the product suspension which is substantially free of abrasive particles overflows, but after a certain time the supply of feed suspension must be halted and the residue, or material containing the abrasive particles, removed from the centrifuge bowl. An example of a suitable batch type centrifuge is the knife discharge centrifuge which is described at pages 19-92 and 19-93 of the "Chemical Engineers' Handbook", 5th Edition, by Robert H. Perry and Cecil H. Chilton, published by McGraw-Hill, Inc., New York, 1973. With a continuous discharge centrifuge the feed suspension is supplied continuously and the product and residue material withdrawn continuously. An example of a suitable continuous discharge centrifuge is the continuous decanter, or scroll discharge, centrifuge which is described in the "Chemical Engineers' Handbook" at pages 19-91 and 19-92.

It may be advantageous to supply the feed suspension to the centrifuge at elevated temperature, for example at a temperature in the range of from 25° C. to 95° C.

The invention is illustrated by the following Examples.

EXAMPLE 1

Crude natural chalk from Wiltshire was subjected to pebble milling for a short time in the presence of water and a dispersing agent in order to form a deflocculated suspension of natural chalk which contained 70% by weight of chalk and which was substantially free of large flint particles. This suspension was then further treated in an attrition grinding mill using as the grinding medium Leighton Buzzard sand, consisting of particles in the size range from 0.5 to 1.0 mm, until the particle size distribution of the chalk was such that 90% by weight of the particles had an equivalent spherical diameter smaller than 2 $\mu$m. The dispersing agent used was a sodium polyacrylate having a number average molecular weight of 1650 and the total amount used was 0.3% by weight based on the weight of dry chalk. The suspension of finely ground chalk was then passed through a sieve having a nominal aperture of 0.25 mm in order to separate the chalk from the grinding medium. The chalk passing through the sieve contained 3% by weight of particles having an equivalent spherical diameter larger than 10 $\mu$m and it had an abrasion of 110 as measured by the Valley abrasion test.

Samples of this suspension were passed straight from the attrition grinding mill, at an initial temperature of 85° C., through a continuous decanter centrifuge which comprised a bowl having a cylindrical portion of diameter 457 mm and length of 457 mm and a frusto-conical portion of length 254 mm and tapering to a diameter of 365 mm. The volume of the "pond" in the centrifuge was 27.2 liters. The bowl could be driven at various speeds by a 40 HP motor. The scroll conveyor for removing the deposited solids from the inside of the bowl was driven, at a speed which was about 9-12 rpm less than the bowl speed, from the main shaft of the bowl through a planetary gear box. The product suspension overflowed at the larger diameter end of the bowl and the residue was conveyed towards the smaller diameter end. The frusto-conical portion of the bowl provided a dry "beach" on which liquid could drain away from the residue before the residue was discharged from the bowl through suitable ports.

The centrifuge was rotated at different speeds and samples of the suspension were passed through at different feed rates in order to determine the maximum rate at which the feed suspension could be passed through at a given centrifuge speed and still obtain the desired reduction in abrasion and in the proportion by weight of particles having an equivalent spherical diameter larger than 10 $\mu$m. The results obtained are set forth in Table 1 below.

TABLE 1

| Centrifuge speed | Acceleration (x g) | Residence time (seconds) | Acceleration x Residence time g-seconds | Feed rate (Liters per min) | Valley Abrasion | % by weight of particles large than 10$\mu$m e.s.d. |
|---|---|---|---|---|---|---|
| 1200 | 318 | 55 | 17,500 | 30 | 30 | 0.5 |
| 1400 | 433 | 48 | 20,800 | 34 | 30 | 0.4 |

TABLE 1-continued

| Centrifuge speed | Acceleration (x g) | Residence time (seconds) | Acceleration x Residence time g-seconds | Feed rate (Liters per min) | Valley Abrasion | % by weight of particles large than 10μm e.s.d. |
| --- | --- | --- | --- | --- | --- | --- |
| 1600 | 566 | 29 | 16,400 | 57 | 30 | 0.5 |

In each case the product overflowed from the centrifuge in the form of a stable pumpable suspension having a solids content of 70% by weight and with properties suitable for transport and storage. The residue was discharged in substantially dry form, having a solids content in the range from 85–90% by weight.

EXAMPLE 2

Crude natural chalk from the Paris Basin, France was treated in the manner described in Example 1 so that the finely ground chalk in the suspension passing through the 0.25 mm sieve associated with the attrition grinding mill had a particle size distribution such than 91% by weight consisted of particles having an equivalent spherical diameter smaller than 2 μm, 1.3% by weight consisted of particles having an equivalent spherical diameter larger than 10 μm and 0.76% by weight consisted of particles larger than 53 μm.

This suspension was fed at a solids content of 75% by weight and at ambient temperature into a knife discharge or "peeler" centrifuge having a cylindrical bowl of internal diameter 1050 mm and length 500 mm rotating about a horizontal axis. The liquid fraction overflowed from the centrifuge over a weir of height 150 mm above the bowl wall and the solid fraction which accumulated on the bowl wall was removed by halting the flow of feed suspension and peeling out the accumulated solids by means of a double-bladed knife the position of which along the axis of the centrifuge and the radial distance from the bowl wall were controlled by suitable hydraulic rams. The centrifuge bowl was run at a speed of 1065 rpm during the feeding and solids deposition part of the cycle and at 650 rpm, for peeling out the solids.

At the beginning of the run the centrifuge was accelerated from rest to 1065 rpm in 3 minutes and the feed suspension was then introduced and product began to overflow as soon as the bowl was full. The introduction of feed suspension and withdrawal of product continued for 30 minutes after which time the solids were found almost to fill the bowl and the material overflowing from the bowl was recycled to the feed reservoir. The supply of feed suspension with recycling of the overflow was continued for 4 minutes, after which time the bowl was retarded to 650 rpm in 3 minutes, the solids were peeled out in 1 minute, the bowl was accelerated to 1065 rpm in 2 minutes and feed suspension was reintroduced to start a new cycle. The feed was introduced at a rate of 154 liters per minute to give an average feed rate over the 40 minute cycle of 114 liters per minute. At 1065 rpm the acceleration of the centrifuge was 475 g. The volume of the centrifuge pond was 425 liters and at a feed rate of 154 liters per minute the residence time was 165 seconds so that the acceleration x residence time was 78,500 g-seconds.

The average product had a particle size distribution such that 88% by weight consisted of particles having an equivalent spherical diameter smaller than 2 μm, 0.1% by weight consisted of particles having an equivalent spherical diameter larger than 10 μm, and 0.03% by weight consisted of particles larger than 53 μm. The Valley abrasion value was 23. The product suspension had a solids content of 73% by weight and had properties suitable for transport and storage. The residue removed from the centrifuge had an average solids content of 87% by weight and was in a substantially dry and easily handlable form.

EXAMPLE 3

Crude natural chalk from Wiltshire was treated in the manner described in Example 1 so that the finely ground chalk in the suspension passing through the 0.23 mm sieve associated with the attrition grinding mill had a particle size distribution such that 90% by weight consisted of particles having an equivalent spherical diameter smaller than 2 μm.

Samples of this suspension were passed straight from the attrition grinding mill, at an initial temperature of 85° C., through a continuous decanter centrifuge similar to that described in Example 1.

Samples of the suspension were passed through at different feed rates and the proportion by weight of particles having an equivalent spherical diameter larger than 10 μm and the Valley abrasion value were measured for the feed and for the product suspensions. The bowl speed remained constant at 1600 rpm and the scroll conveyor rotated at 16 rpm less than the bowl; unless the solids accumulated in the bowl necessitating greater torque, in which case the differential speed was increased to 20 rpm. The volume of the centrifuge pond was 27.2 liters and the acceleration of the centrifuge at 1600 rpm was 566 g.

The results obtained are set forth in Table II below.

TABLE II

| Feed rate (G.P.M.) | Feed rate (liters per min) | Residence Time (seconds) | Acceleration × Residence Time g-seconds | % by way larger than 10 μm Feed | % by way larger than 10 μm Product | Valley abrasion Feed | Valley abrasion Product | % by weight of solids Feed | % by weight of solids Product |
| --- | --- | --- | --- | --- | --- | --- | --- | --- | --- |
| 20 | 91 | 18 | 10,200 | 1.13 | 0.28 | 120 | 43 | 72.5 | 72.0 |
| 18 | 82 | 20 | 11,300 | 1.13 | 0.28 | 127 | 33 | 72.0 | 71.8 |
| 15 | 68 | 24 | 13,580 | 1.36 | 0.34 | 253 | 30 | 72.0 | 71.8 |
| 10 | 45 | 36 | 20,350 | 1.30 | 0.30 | 97 | 27 | 72.5 | 72.0 |
| 6 | 27 | 60 | 33,900 | 1.30 | 0.10 | 103 | 27 | 72.5 | 71.5 |
| 5 | 23 | 72 | 40,700 | 1.24 | 0.07 | 103 | 27 | 72.5 | 72.0 |

In each case the product overflowed from the centrifuge in the form of a stable pumpable suspension with properties suitable for transport and storage. The residue was discharged in substantially dry form, having a solids content in the range from 85 to 90% by weight.

EXAMPLE 4

In this example, further tests were conducted utilizing a pilot plant 18"×28" Bird solid bowl centrifuge. This device had a geometry similar to that of the centrifuge described in Example 1.

A natural fine-ground calcite slurry derived from a Maryland calcite deposit, which had been previously beneficiated and ground, was fed to the Bird centrifuge. The physical characteristics of the feed slurry were such that 89% by weight of the particles were smaller than 2 microns equivalent spherical diameter (e.s.d.). The slurry had a solids content of 70.2% by weight (29.8% moisture). This slurry when subjected to the Hegman Grind Test, i.e. the well-known procedure utilized especially in the paint industries, yielded a value of 5.5 indicating that a significant number of 31 micron particles were present, but essentially no particles larger than 31 micron e.s.d. were present. The said slurry was passed through the Bird centrifuge at the rate of 21 gallons per minute with the centrifuge bowl being operated at a speed of 1600 rpm, producing an acceleration of 650 g. The product of residence time (in seconds) and centrifuge acceleration (as a g-multiple), was 12,200 g-seconds. 99% of the solids were recovered in the fine fraction. The fine fraction leaving the centrifuge had a particulate size distribution such that 92% by weight of the particles were smaller than 2 microns e.s.d; the solids content of the fine fraction of the slurry was 70.1% by weight (29.9% moisture). The Hegman Grind test gave a value of 6.0 for the fine fraction indicating that a significant number of 25 micron particles were present, but that essentially no particles larger than 25 micron e.s.d. were present.

The torque on the coarse particle discharge scroll was low. The coarse fraction leaving the centrifuge had 40% by weight thereof less than 2 micron e.s.d. The said fraction had 87.2% solids content. The fraction was very viscous, but still sufficiently fluid to flow.

I claim:

1. In a method of preparing a stable, pumpable suspension of a calcium carbonate mineral, the improvement which comprises removing abrasive particles from a deflocculated, concentrated aqueous suspension of the calcium carbonate mineral by centrifuging the suspension at a solids content of at least 65% by weight under conditions such that the product of the residence time of the aqueous suspension in the centrifuge and the acceleration to which the suspension is subjected is at least 12,000 g seconds, whereby the quantity of particles having an equivalent spherical diameter larger than 10 $\mu$m present in said suspension is reduced.

2. A method of preparing an aqueous suspension of a calcium carbonate mineral which is substantially free of abrasive particles, which method comprises comminuting said calcium carbonate mineral under conditions such that there is obtained a deflocculated aqueous suspension of the calcium carbonate mineral which has a solids content of at least 65% by weight and which is substantially free of particles larger than 50 $\mu$m; and centrifuging said deflocculated aqueous suspension of calcium carbonate mineral under conditions such that the product of the residence time of the aqueous suspension in the centrifuge and the acceleration to which the suspension is subjected is at least 12,000 g seconds, whereby there is obtained a calcium carbonate product, of which the content of particles having an equivalent spherical diameter larger than 10 $\mu$m is less than 1% by weight and which is in the form of a stable, pumpable suspension, and a residue which contains particles larger than 10 $\mu$m in a substantially dry form.

3. A method according to claim 1 or 2, wherein the solids content of the deflocculated aqueous suspension fed to the centrifuge is in the range from 70% to 85% by weight.

4. A method according to claim 1 or 2, wherein the suspension is deflocculated with from 0.05% to 0.50% by weight, based on the weight of dry calcium carbonate, of an organic polymeric dispersing agent.

5. A method according to claim 4, wherein the dispersing agent is a water-soluble salt of a poly(acrylic acid) or of a poly (methacrylic acid) having a number average molecular weight not greater than 5,000.

6. A method according to claim 1 or 2, wherein the aqueous suspension of the calcium carbonate mineral is centrifuged under conditions subjecting the aqueous suspension to an acceleration of at least 300 g.

7. A method according to claim 1 or 2, wherein the deflocculated aqueous suspension of the calcium carbonate mineral is fed to the centrifuge at a temperature in the range of from 25° C. to 95° C.

8. A method according to claim 1 or 2, wherein said deflocculated aqueous suspension of the calcium carbonate mineral is fed continuously to a continuous discharge centrifuge, and a stable, pumpable suspension containing less than 1% by weight of particles larger than 10 $\mu$m is withdrawn continuously from said centrifuge.

* * * * *